(12) United States Patent
Lu et al.

(10) Patent No.: US 10,416,780 B2
(45) Date of Patent: Sep. 17, 2019

(54) MECHANICAL KEYBOARD WITH REDUCED NUMBER OF KEYS

(71) Applicants: DEXIN ELECTRONIC LTD., Donggaun, Guangdong (CN); DEXIN CORPORATION, New Taipei (TW)

(72) Inventors: Ho-Lung Lu, New Taipei (TW); Ching-Tsun Hong, New Taipei (TW)

(73) Assignees: DEXIN ELECTRONIC LTD., Dongguan Guangdong (CN); DEXIN CORPORATION, New Taipei (TW)

( * ) Notice: Subject to any disclaimer, the term of this patent is extended or adjusted under 35 U.S.C. 154(b) by 104 days.

(21) Appl. No.: 15/653,122

(22) Filed: Jul. 18, 2017

(65) Prior Publication Data
US 2019/0025937 A1 Jan. 24, 2019

(51) Int. Cl.
G06F 3/02 (2006.01)
A63F 13/24 (2014.01)
H01H 13/83 (2006.01)

(52) U.S. Cl.
CPC ............ *G06F 3/0219* (2013.01); *A63F 13/24* (2014.09); *G06F 3/0221* (2013.01); *G06F 3/0208* (2013.01); *H01H 13/83* (2013.01); *H01H 2219/039* (2013.01); *H01H 2231/008* (2013.01); *H01H 2233/07* (2013.01)

(58) Field of Classification Search
CPC ...... G06F 3/0219; G06F 3/0208; A63F 13/24; A63F 2009/2404; H01H 13/83; H01H 2231/008; H01H 2233/07; H01H 2219/039
See application file for complete search history.

(56) References Cited

U.S. PATENT DOCUMENTS

| 2015/0261313 A1* | 9/2015 | Yoo | G06F 3/0202 345/170 |
| 2017/0003754 A1* | 1/2017 | Geary | G06F 3/0202 |
| 2017/0242493 A1* | 8/2017 | Yang | F21V 19/0015 |

FOREIGN PATENT DOCUMENTS

| CN | 202796585 U | 3/2013 |
| CN | 204614703 U | 9/2015 |
| CN | 205723251 U | 11/2016 |
| TW | M435034 U1 | 8/2012 |

OTHER PUBLICATIONS

Lee, Xah; The Idiocy of Happy Hacking Keyboard; Sep. 16, 2016, https://web.archive.org/web/20160923120746/http://xahlee.info/kbd/idiocy_of_happy_hacking_keyboard.html; p. 1 (Year: 2016).*

* cited by examiner

*Primary Examiner* — Jonathan A Boyd
(74) *Attorney, Agent, or Firm* — Li & Cai Intellectual Property (USA) Office

(57) ABSTRACT

A mechanical keyboard with reduced number of keys includes many mechanical keys which are divided into a function section and an alphanumeric section disposed at one side of the function section. Each mechanical key has a keycap. The keycap has a light-transmitting character symbol on a top surface thereof. At least one mechanical key is a self-defined key in the function section or the alphanumeric section. Each keycap of the self-defined key has a top wall and a side wall facing a user. The top wall and the side wall respectively have a light-transmitting character symbol. Each self-defined key has a first lighting module and a second lighting module which are alternatively activated to light. The first lighting module corresponds to the top wall of the self-defined key. The second lighting module corresponds to the side wall of the self-defined key.

8 Claims, 6 Drawing Sheets

MECHANICAL KEYBOARD WITH REDUCED NUMBER OF KEYS

BACKGROUND OF THE INVENTION

1. Field of the Invention

The present disclosure is related to a mechanical keyboard. In particular, the present disclosure relates to a mechanical keyboard with reduced number of keys.

2. Description of Related Art

With the burgeoning development and popularity of video games, the functions and comfortability in use of keyboard become more and more important. The keyboard can not only input different alphabets but also control the computer system. The most common keyboard commercially available is the 101-key keyboard and the 104-key keyboard. Some professional gaming keyboards even have more keys and are high-priced.

Since video games are popular among young people, game developers continuously introduce various video games to attract game players' attention and arouse their interest in playing the games. Timing has become one of the critical factors in completing game levels, and thus, the keyboard shortcuts are very important. However, in addition to the large volume of a keyboard and the difficulty in recognizing the position of each keyboard key, the size of each keycap also significantly affects the comfortability in operation.

Hence, the present disclosure provides a mechanical keyboard with reduced number of keys to overcome the aforementioned drawbacks.

SUMMARY OF THE INVENTION

One of the objectives of the present disclosure is to provide a mechanical keyboard with reduced number of keys, in which the keyboard is a reduced-size and its keys are user-defined, so that troubles in adapting positions of the keys and improper typing postures can be effectively avoided.

In order to achieve the above objectives, according to one exemplary embodiment of the present disclosure, a mechanical keyboard with reduced number of keys is provided, which includes a plurality of mechanical keys. The mechanical keys are divided into a function section, and an alphanumeric section which is disposed at one side of the function section. Each of the mechanical keys has a keycap, and a mechanical switch which is disposed under the keycap. The keycap has a light-transmitting character symbol on a top surface thereof. At least one mechanical key is a self-defined key in the function section or the alphanumeric section. The keycap of each self-defined key has a top wall, and a side wall facing a user. The top wall and the side wall respectively have a light-transmitting character symbol. Each of the self-defined keys has a first lighting module and a second lighting module which are alternatively activated to light. The first lighting module corresponds to the top wall of the self-defined key, and the second lighting module corresponds to the side wall of the self-defined key.

Thus, the present disclosure has advantages as follows. The mechanical keyboard with reduced number of keys according to the present disclosure has at least one self-defined key, and its keycap has a top wall and a side wall facing a user. The top wall and the side wall respectively have a light-transmitting character symbol. Each of the self-defined key has a first lighting module and a second lighting module which are alternatively activated to light. The first lighting module corresponds to the top wall of the self-defined key, and the second lighting module corresponds to the side wall of the self-defined key. When a video game is being played, the first and second lighting modules can correspondingly illuminate the light-transmitting character symbol on the top wall and the side wall of the self-defined key, and the symbol designated by the user is lightened to remind the user which key is appropriate to be pressed.

In addition, the mechanical keyboard of the present disclosure contains keys on a left half side of a standard QWERTY keyboard. The function section and the alphanumeric section include a total of 35 mechanical keys which are most commonly used in video games. The total width of the present disclosure is smaller than that of the standard QWERTY keyboard, but a left half side of the standard QWERTY keyboard is remained. Furthermore, each mechanical key 10 has a size and a layout identical to the standard QWERTY keyboard, so that the user does not have troubles in adapting positions of the keys and different layouts of the keyboard keys.

Moreover, the mechanical keyboard has a mechanical switch under each keycap, which can enhance the tactile sensation when the user is operating the keyboard.

For further understanding of the present disclosure, reference is made to the following detailed description illustrating the embodiments and examples of the present disclosure. The description is for illustrative purpose only and is not intended to limit the scope of the claim.

DETAILED DESCRIPTION OF THE EXEMPLARY EMBODIMENTS

The aforementioned illustrations and following detailed descriptions are exemplary for the purpose of further explaining the scope of the present disclosure. Other objectives and advantages related to the present disclosure will be illustrated in the subsequent descriptions and appended drawings.

Figure 1:
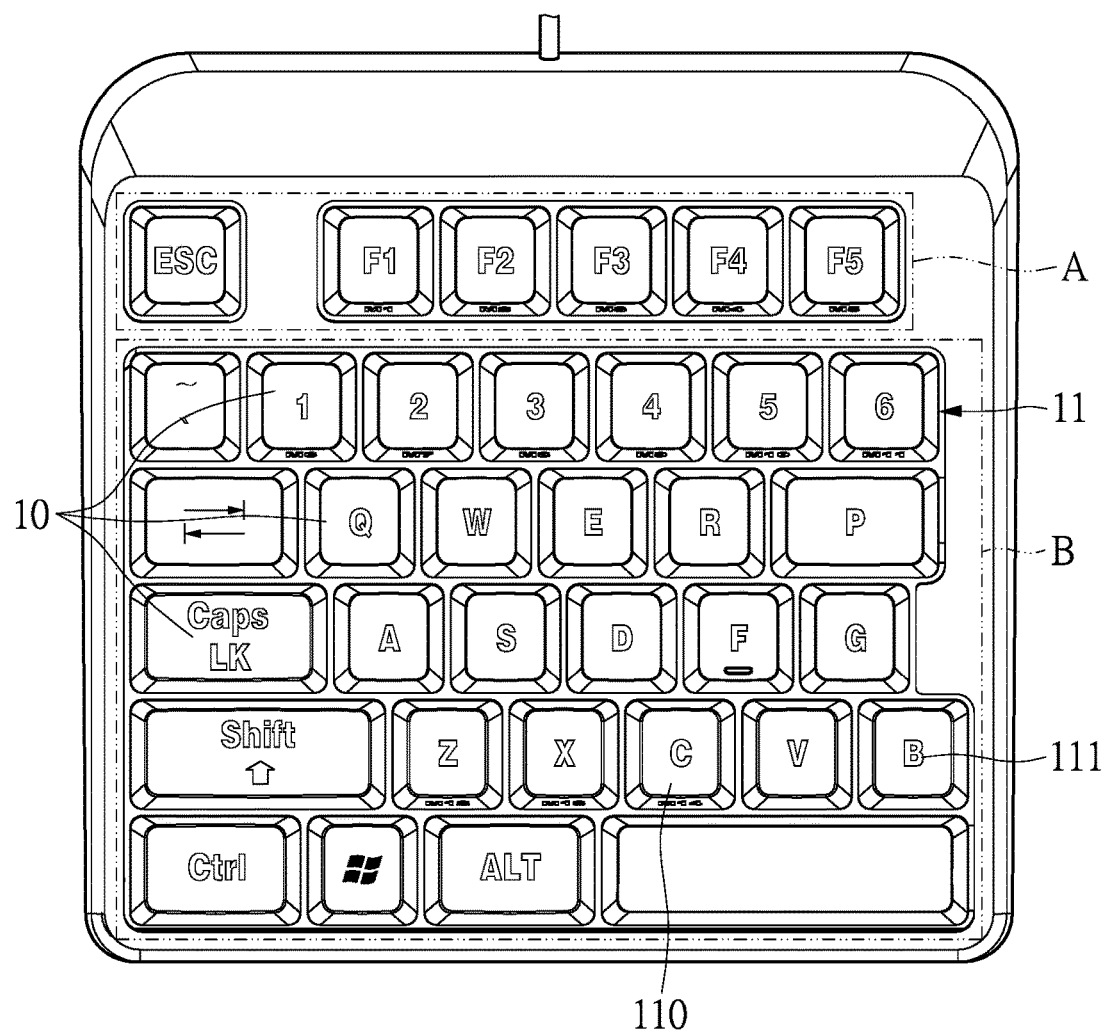
FIG. 1 is a top view of a mechanical keyboard with reduced number of keys according to the present disclosure.

Reference is made to FIG. 1. The present disclosure provides a mechanical keyboard with reduced number of keys 1, which includes a plurality of mechanical keys 10 and self-defined keys 11, and a collapsible leg 12 disposed on a bottom surface which can be referred to FIG. 6.

Figure 2:
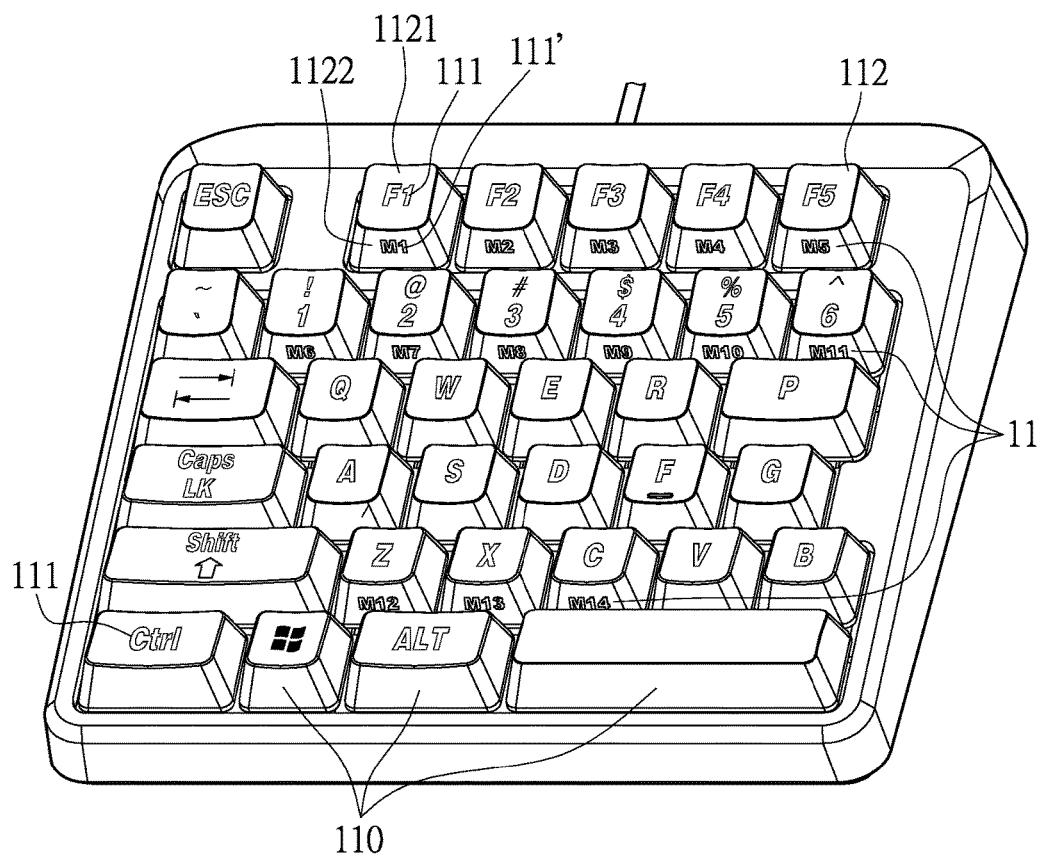
FIG. 2 is a perspective view of the mechanical keyboard with reduced number of keys according to the present disclosure.

Reference is made to FIG. 1 and FIG. 2. The mechanical keys 10 are divided into a function section A and an alphanumeric section B. The alphanumeric section B is disposed at one side of the function section A. In this embodiment, the function section A is disposed at a top side of the alphanumeric section B. Each mechanical key 10 has a keycap 110. The keycap 110 has a light-transmitting character symbol 111 which is formed on a top surface thereof. In detail, all of the function section A and the alphanumeric section B are mechanical keys 10. Each keycap 110 of the mechanical keys 10 has the light-transmitting character symbol 111 on its top surface.

Figure 3:
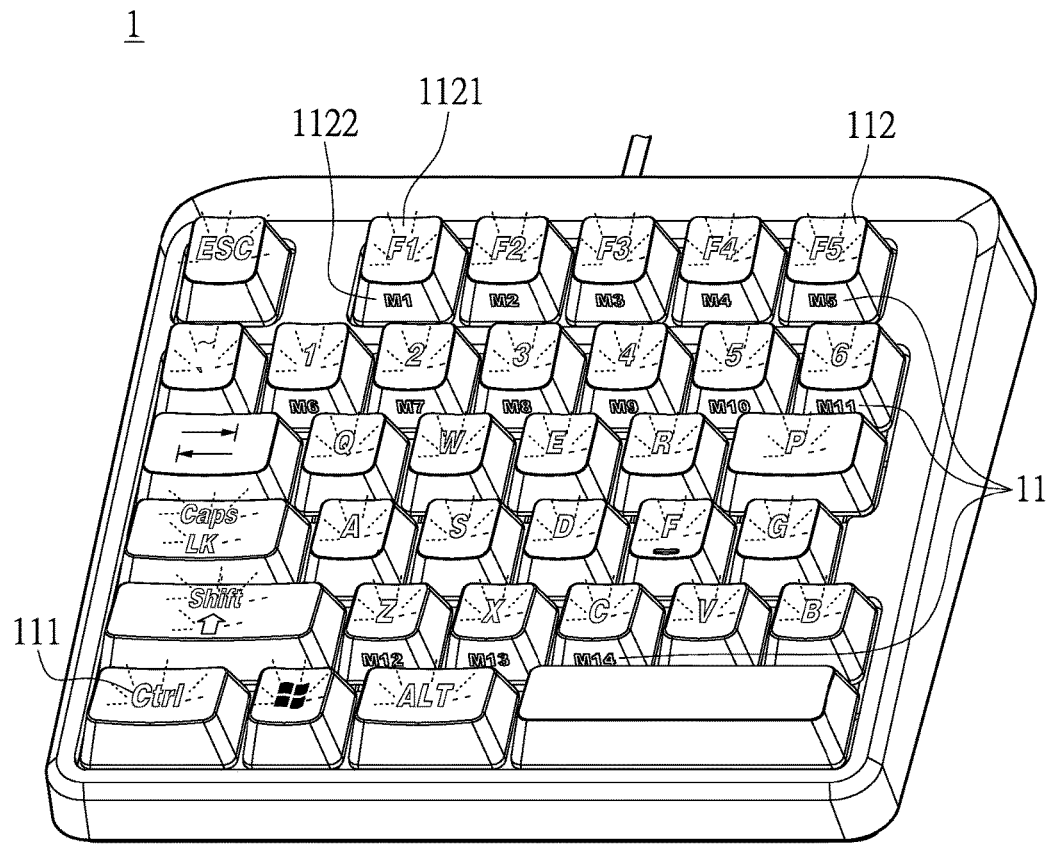
FIG. 3 is a perspective view of the mechanical keyboard with reduced number of keys according to the present disclosure.

According to this embodiment, the mechanical keyboard 1 has a plurality of self-defined keys 11, which are respectively disposed in the function section A and the alphanumeric section B. For example, function keys F1 to F5 can be designated to be functioned as M1 to M5. The numeral keys 1 to 6 can be designated to be functioned as M6 to M11. The three alphabet keys Z, X, C can be designated to be functioned as M12 to M14. Functions of M1 to M14 can be set up by the user through software of a computer. However, the quantity and position of the self-defined keys of the present disclosure are not limited thereto. Each keycap 110 of the self-defined key 11 has a top wall 1121 and a side wall 1122 facing the user. The top wall 1121 and the side wall 1122 respectively have a light-transmitting character symbol 111 and 111'. The self-defined key 11 can be designated by the user to output a signal or function corresponding to that of the light-transmitting character symbol 111, or that of the light-transmitting character symbol 111'. As shown in FIG. 2 and FIG. 3, to give an example of function key F1, when the self-defined key 11 is pressed and conducted in a common first condition, it can output a signal or function corresponding to the light-transmitting character symbol 111, represented by F1. However, if the user designates the self-defined key 11 in a computer as corresponding to a signal of the light-transmitting character symbol 111', after the self-defined key 11 is pressed in a second condition and conducted, it will output a signal or function corresponding to the light-transmitting character symbol 111', represented by M1.

Figure 5:
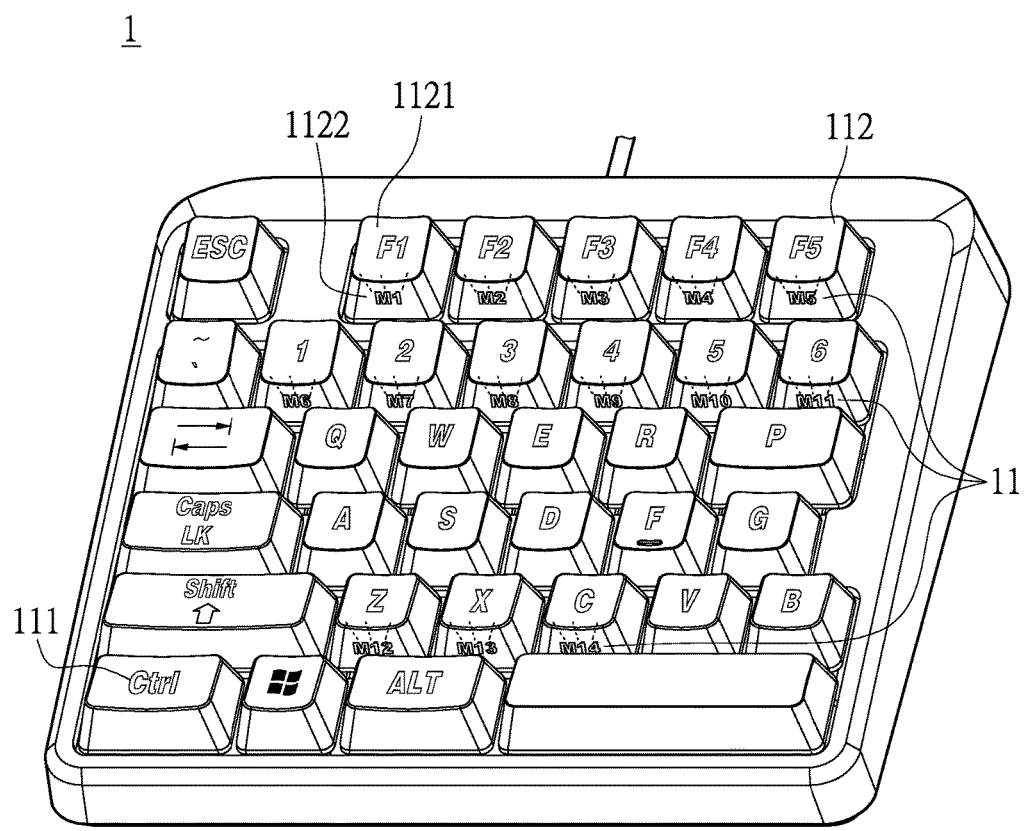
FIG. 5 is a perspective view of the mechanical keyboard with reduced number of keys according to the present disclosure.

Reference is made to FIG. 3 and FIG. 5. In this embodiment, for conveniently recognizing which condition of each self-defined key 11 is designated by the user, each self-defined key 11 has a first lighting module 113 and a second lighting module 114 which can be alternatively activated to light. That is, only one lighting module is lighted at a time. The first lighting module 113 is lighted correspondingly to the top wall 1121 of the self-defined key 11. The second lighting module 114 is corresponding to the side wall 1122 of the self-defined key 11. As shown in FIG. 3, when the self-defined key 11 is designated in the first condition, the first lighting module 113 is activated to light, so that the light-transmitting character symbol 111 on the top wall 1121 of the self-defined key 11 is lightened to emit a light corresponding to the first lighting module 113. As shown in FIG. 5, when the self-defined key 11 is designated in the second condition, the second lighting module 114 is activated to light, so that the light-transmitting character symbol 111' on the side wall 1122 of the self-defined key 11 is lightened to emit a light corresponding to the second lighting module 114. Therefore, it can indicate the user which condition of the self-defined key 11 is designated and which signal of a character symbol will be outputted when the user presses the self-defined key 11. Each self-defined key 11 has a self-defined function, and the user can set up the self-defined function according to usage conditions and demands.

Figure 4:
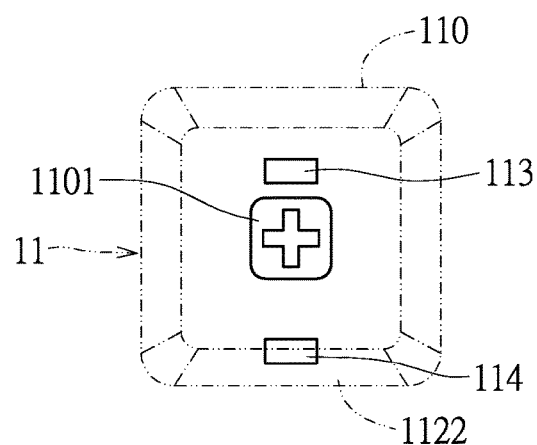
FIG. 4 is a bottom view of the mechanical keyboard with reduced number of keys according to the present disclosure.

Reference is made to FIG. 1 and FIG. 4. FIG. 4 is illustrated with a single key. Each of the mechanical keys 10 has a mechanical switch 1101 on a bottom of the keycap 110. The mechanical switch 1101 is not limited by any aspects. For further details, the mechanical switch 1101 can enhance the tactile sensation when the user is operating the keyboard; especially for eSports games, a reinforced tactile sensation is feedbacked to the user when pressing the key. Each keycap 110 of the mechanical keys 10 can be made of polybutylene terephthalate (PBT) which is a material of hardness and ruggedness, so that certain oily substances secreted from the user's fingers are not prone to remain on the keycap. In addition, as the PBT has micro-particles on its surface, the user's fingerprints are unsusceptible to leaving on the keycap. Thus, the present disclosure is advantageous to bring the user the more comfortable tactile sensation, and compared with its conventional counterparts the maintenance is easier to be carried out.

Figure 6:
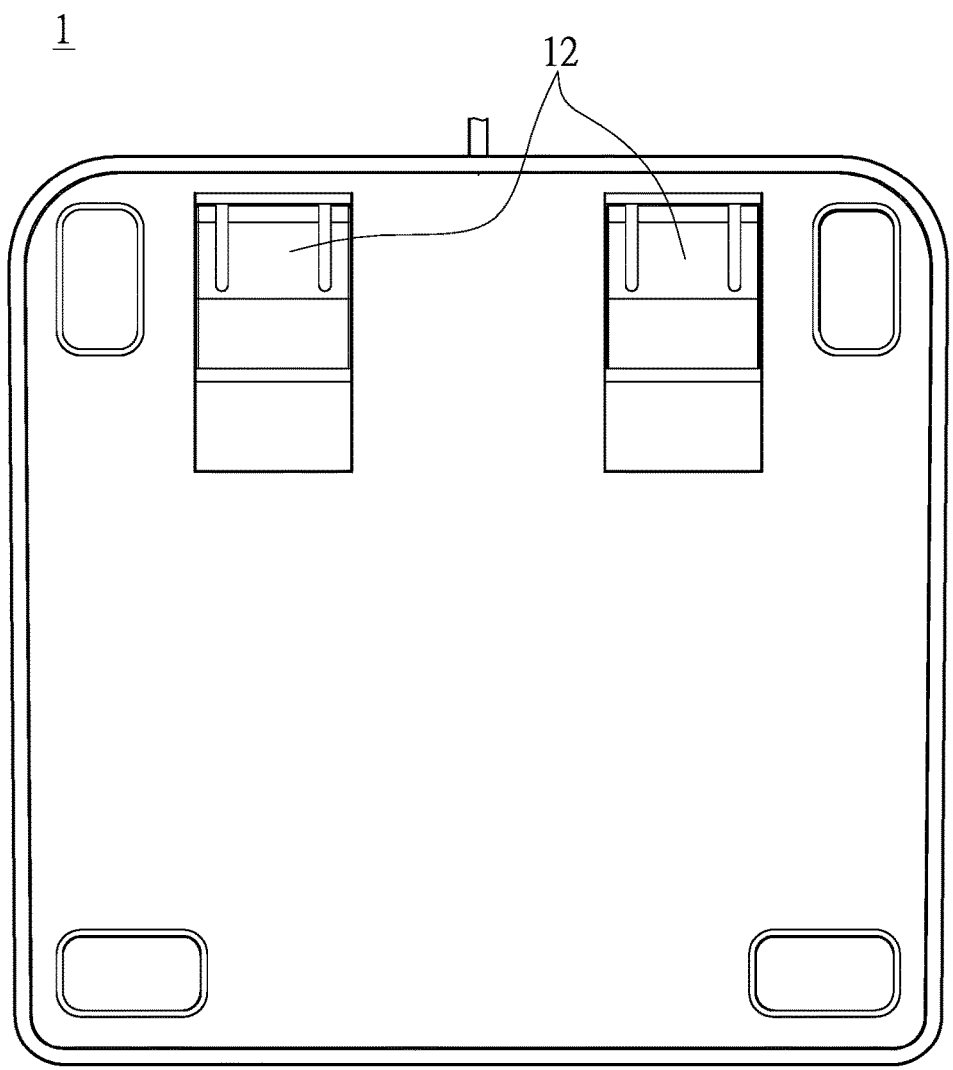
FIG. 6 is a bottom view of the mechanical keyboard with reduced number of keys according to the present disclosure.

Reference is made to FIG. 1. In the mechanical keyboard 1, the mechanical keys 10 contain keys in a left half side of a standard QWERTY keyboard. The function section A and the alphanumeric section B contain a total of 35 mechanical keys 10. The function section A has five keys, "F1" to "F5". The alphanumeric section B has three rows of alphabetic keys, and each row of the alphabetic keys has five keys, "QWERP", "ASDFG" and "ZXCVB" respectively. Each keycap 110 has a light-transmitting character symbol 111 which is painted and laser engraved thereon. In detail, the mechanical keyboard 1 integrates the keys which are most commonly used in video games to be a total of 35 mechanical keys, and substantially has a width one-third of a standard QWERTY keyboard. The advantage is that each mechanical key 10 has a size and a layout identical to the standard QWERTY keyboard, so that the user does not have trouble recognizing the size and the layout. Reference is made to FIG. 6. The mechanical keyboard with reduced number of keys 1 further includes a collapsible leg 12. The collapsible leg 12 is disposed on a bottom side of the mechanical keyboard 1, and the height of the collapsible leg 12 can be adjusted according to user's usage habit. The collapsible leg 12 can be made by a double injection method.

Reference is made to FIG. 4. In this embodiment, the first lighting module 113 is disposed at one side of the mechanical switch 1101, and the second lighting module 114 is disposed at one side of the side wall 1122 of the self-defined key 11. For more details, the first lighting module 113 is lighted correspondingly to the top wall 1121 of the self-defined key 11. Thus, a light from the first lighting module 113 is a light source to supply the top wall 1121, and the light source only shines to the top wall 1121. In a similar way, the second lighting module 114 is lighted correspondingly to the side wall 1122 of the self-defined key 11, so that a light from the second lighting module 114 can be a light source to illuminate the side wall 1122, and only illuminate the side wall 1122.

Reference is made to FIG. 3 to FIG. 5. In this embodiment, the first lighting module 113 and the second lighting module 114 are preferably a light having its own color, so that the user can more easily recognize the position of the self-defined keycap 112, but the colors are not limited in the present disclosure.

Figure 7:
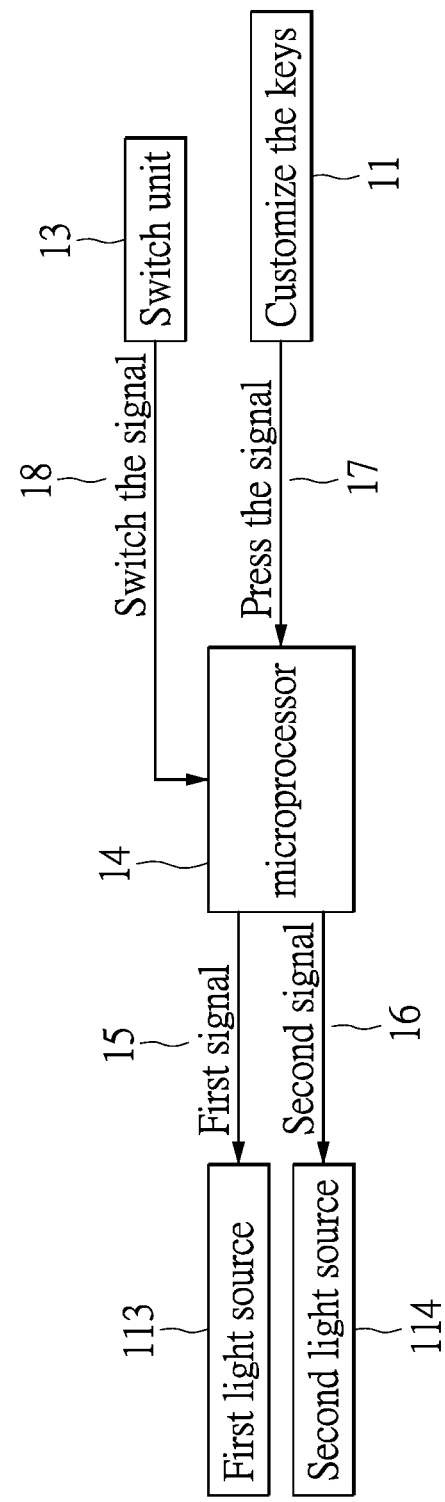
FIG. 7 is a block diagram showing a lighting activity of the mechanical keyboard with reduced number of keys according to the present disclosure.

Reference is made to FIG. 7, which is a lighting diagram of the mechanical keyboard with reduced number of keys 1 according to the present disclosure. In this embodiment, the mechanical keyboard 1 has a built-in microprocessor 14. When the self-defined key 11 is designated as the first condition or the second condition, the built-in microprocessor 14 correspondingly outputs a first signal 15 or a second signal 16. When the self-defined key 11 is designated as the first condition, the microprocessor 14 outputs the first signal 15 to illuminate the first lighting module 113. When the self-defined key 11 is designated as the second condition, the microprocessor 14 outputs the second signal 16 to illuminate the second lighting module 114. When the first condition is designated, after the self-defined key 11 is pressed, a pressing signal 17 is produced and transmitted to the microprocessor 14, then the microprocessor 14 outputs a default signal or function corresponding to the light-transmitting character symbol 111 to the computer, for example, F1. When the second condition is designated by the switching unit 13, the pressing signal 17 is associated with a switching signal 18, then the microprocessor 14 outputs a default signal or function corresponding to the light-transmitting character symbol 111', for example, M2. It is noted that the switching unit 13 can be functioned by a software program, such as gameplay software or by a hardware key, such as a key of Cap Lock, or other keys.

The descriptions illustrated supra set forth simply the preferred embodiments of the present disclosure; however, the characteristics of the present disclosure are by no means restricted thereto. All changes, alterations, or modifications conveniently considered by those skilled in the art are deemed to be encompassed within the scope of the present disclosure delineated by the following claims.

What is claimed is:

1. A mechanical keyboard with reduced number of keys over that of a standard QWERTY keyboard, said mechanical keyboard comprising:

a plurality of mechanical keys being divided into a function section and an alphanumeric section disposed at one side of the function section, the alphanumeric section having three rows of alphabetic keys, and each row of the alphabetic keys having five keys, "QWERP", "ASDFG" and "ZXCVB" respectively, each of the mechanical keys having a keycap, and a mechanical switch disposed under the keycap, the keycap having a light-transmitting character symbol on a top surface thereof; wherein at least one mechanical key is a self-defined key in the function section or the alphanumeric section, the keycap of each self-defined key has a top wall and a side wall facing a user, the top wall has a first light-transmitting character symbol and the side wall has a second light-transmitting character symbol; each self-defined key has a first lighting module and a second lighting module which are alternatively activated to light, the first lighting module faces the top wall of the self-defined key, and the second lighting module faces the side wall of the self-defined key;

a built-in microprocessor, outputting a first signal and a second signal; wherein the first lighting module is lighted when outputting the first signal, wherein the second lighting module is lighted when outputting the second signal; and a switching unit, producing a switching signal to the microprocessor to switch the self-defined key in a first condition or a second condition;

wherein when the self-defined key is designated in the first condition, the microprocessor outputs the first signal to turn on the first lighting module in the self-defined key and illuminate the first light-transmitting character symbol; wherein when the self-defined key is designated in the second condition, the microprocessor outputs the second signal to turn on the second lighting module in the self-defined key and illuminate the second light-transmitting character symbol.

2. The mechanical keyboard of claim 1, wherein a number of the self-defined key is plural, and the plurality of self-defined keys are respectively arranged in the function section and the alphanumeric section.

3. The mechanical keyboard of claim 1, further comprising a collapsible leg, and the collapsible leg disposed on a bottom side of the mechanical keyboard.

4. The mechanical keyboard of claim 1, wherein the self-defined keycap of the first lighting module and the second lighting module respectively illuminate different colors.

5. The mechanical keyboard of keys of claim 1, wherein each keycap is made of polybutylene terephthalate.

6. The mechanical keyboard of claim 1, wherein the mechanical keys match with the keys on a left half side of a standard QWERTY keyboard.

7. The mechanical keyboard of claim 1, wherein the function section and the alphanumeric section have a total of 35 mechanical keys.

8. The mechanical keyboard of claim 1, wherein the first lighting module is disposed at one side of the mechanical switch, and the second lighting module is disposed at one side of the side wall of the self-defined key.

* * * * *